UNITED STATES PATENT OFFICE.

ALEXANDER C. WILLS AND HUGH SHARP, OF MARLTON, NEW JERSEY.

IMPROVEMENT IN THE MANUFACTURE OF VINEGAR.

Specification forming part of Letters Patent No. 57,238, dated August 14, 1866.

*To all whom it may concern:*

Be it known that we, ALEXANDER C. WILLS and HUGH SHARP, of Marlton, Burlington county, and State of New Jersey, have invented a new and Improved Mode of Making Vinegar from Apple-Cheese; and we do hereby declare that the following is a full, clear, and exact description thereof.

Under the present mode of making vinegar from the juice which is expressed from apples, where the process is conducted by distillation, the liquor which is left in the still, and also the cheese or pomace, are thrown to waste, which substances, it is found, contain, when properly treated, a very large per cent. of vinegar.

It is the object of our invention to utilize this refuse of apple presses and stills, and to extract the vinegar contained in such refuse by the following process:

After the juice is pressed from the apples it is run into casks and allowed to remain therein until fermentation ceases, when it is distilled in the usual manner for obtaining either whisky or alcohol. The pomace or cheese is allowed to stand in a heap until it ferments and becomes very sour, when it is thrown into a cistern with the liquor which is left after distillation of the cider or expressed juice. The substances thus mixed together are allowed to stand from one to four days, according to the temperature of the weather, after which the pomace is removed and a second time subjected to pressure, the cider being drawn off into casks and allowed to remain until it is converted into vinegar.

The vinegar which is first produced is made from the alcohol which is obtained by the distillation of cider from the press; but that which is afterward produced is obtained from the cider which is made by mixing together the pomace and the liquor left in the still after distillation and allowing them to ferment.

What we claim as new, and desire to secure by Letters Patent, is—

Utilizing the refuse of apple-presses and cider-stills by treating these substances as described to form vinegar.

ALEXANDER C. WILLS.
HUGH SHARP.

Witnesses:
THOMAS EVENS, Jr.,
SAMUEL BOWKER,
EZRA EVANS.